(12) United States Patent
Tajika

(10) Patent No.: US 7,272,455 B2
(45) Date of Patent: Sep. 18, 2007

(54) REMOTE CONTROLLING DEVICE, PROGRAM AND SYSTEM WITH CONTROL COMMAND CHANGING FUNCTION

(75) Inventor: Yosuke Tajika, Kobe (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 747 days.

(21) Appl. No.: 10/665,566

(22) Filed: Sep. 22, 2003

(65) Prior Publication Data
US 2004/0127997 A1 Jul. 1, 2004

(30) Foreign Application Priority Data
Sep. 20, 2002 (JP) ............................ P2002-274366

(51) Int. Cl.
*G05B 19/18* (2006.01)
*G10L 15/00* (2006.01)
*G10L 11/00* (2006.01)
*G05B 11/01* (2006.01)
*G06F 15/16* (2006.01)

(52) U.S. Cl. ............................ 700/65; 700/12; 700/19; 700/66; 709/217; 709/218; 709/219; 709/220; 711/100; 711/111; 711/112; 711/113; 704/251; 704/270; 704/275

(58) Field of Classification Search ................. 700/2–5, 700/12, 19, 65, 66; 709/217–220, 205; 711/100–113, 115, 162–165; 704/251, 270, 704/275
See application file for complete search history.

(56) References Cited
U.S. PATENT DOCUMENTS
6,108,748 A * 8/2000 Ofek et al. .................. 711/112
6,133,938 A * 10/2000 James ......................... 725/80

(Continued)

FOREIGN PATENT DOCUMENTS
JP 10-271573 10/1998

(Continued)

OTHER PUBLICATIONS

Notice of Reasons for Rejection issued by the Japanese Patent Office on Oct. 13, 2006, for Japanese Patent Application No. 2002-274366, and English-language translation thereof.

(Continued)

*Primary Examiner*—David Vincent
*Assistant Examiner*—Sunray Chang
(74) *Attorney, Agent, or Firm*—Finnegan, Henderson, Farabow, Garrett & Dunner, L.L.P.

(57) ABSTRACT

A control device for controlling a control target device includes a control content acquisition unit, a recognition unit, a device control unit, and a communication unit. The control content acquisition unit acquires control information containing operation instructions and control commands from the control target device and stores the control information in a rewritable form. Each operation instruction corresponds to one of the control commands. The recognition unit recognizes an operation instruction entered by a user. The device control unit carries out a search to check whether the operation instruction recognized by the recognition unit is contained in the control information stored in the control content acquisition unit, and outputs a control command corresponding to the operation instruction when the operation instruction is contained in the control information. The communication unit transmits the control command outputted by the device control unit to the control target device.

15 Claims, 11 Drawing Sheets

U.S. PATENT DOCUMENTS

| | | | |
|---|---|---|---|
| 6,381,507 B1 * | 4/2002 | Shima et al. | 700/83 |
| 6,564,245 B1 * | 5/2003 | Fukasawa et al. | 709/205 |
| 6,839,670 B1 * | 1/2005 | Stammler et al. | 704/251 |
| 2002/0184457 A1 * | 12/2002 | Yuasa et al. | 711/161 |
| 2004/0030560 A1 * | 2/2004 | Takami et al. | 704/275 |
| 2004/0048569 A1 * | 3/2004 | Kawamura | 455/41.1 |
| 2004/0111391 A1 * | 6/2004 | Fujita et al. | 707/1 |
| 2004/0153863 A1 * | 8/2004 | Klotz et al. | 714/45 |
| 2006/0031438 A1 * | 2/2006 | Tokuhashi et al. | 709/223 |
| 2006/0048846 A1 * | 3/2006 | Roenneburg et al. | 141/130 |
| 2006/0147235 A1 * | 7/2006 | Sadovsky et al. | 400/62 |

FOREIGN PATENT DOCUMENTS

| | | |
|---|---|---|
| JP | 11-231924 | 8/1999 |
| JP | 2000-076197 | 3/2000 |
| JP | 2000-259851 | 9/2000 |
| JP | 2001-75968 | 3/2001 |
| JP | 2001-268665 | 9/2001 |

OTHER PUBLICATIONS

U.S. Appl. No. 10/412,292, filed Apr. 14, 2003, to Terashima et al.

Notice of Reasons for Refusal issued by the Japanese Patent Office on Feb. 9, 2007, for a counterpart Japanese Patent Application No. 2002-274366, and English-language translation thereof.

* cited by examiner

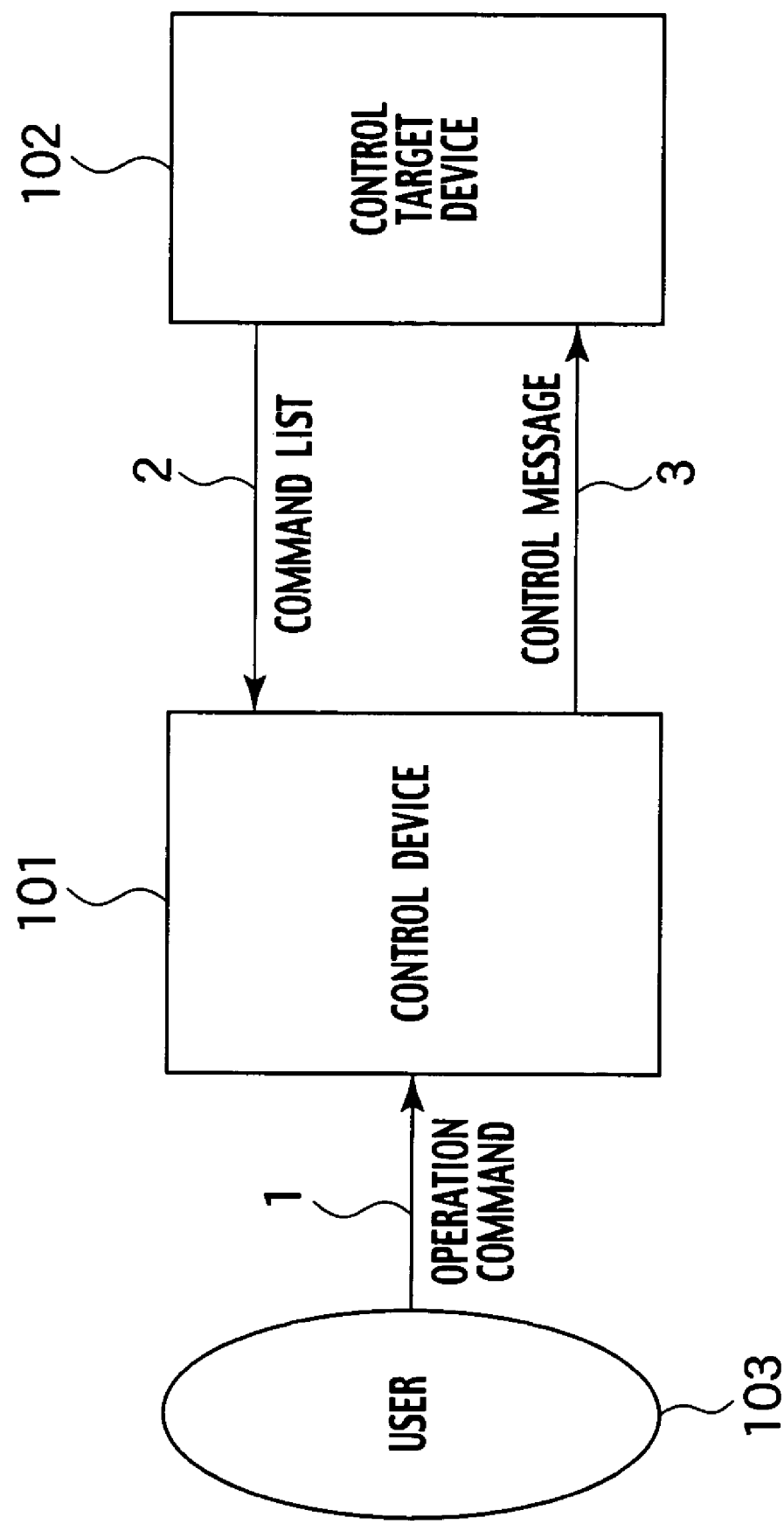

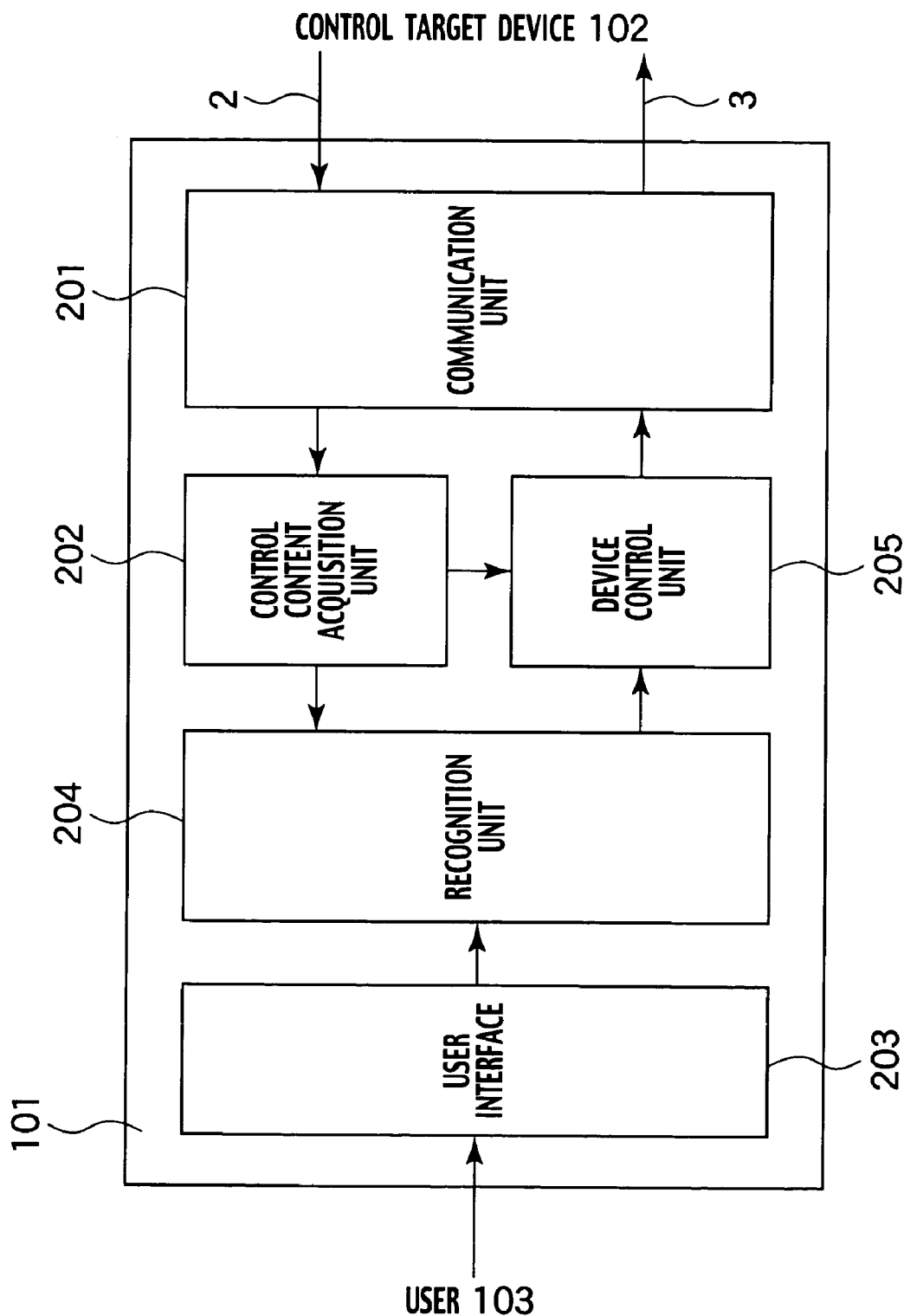

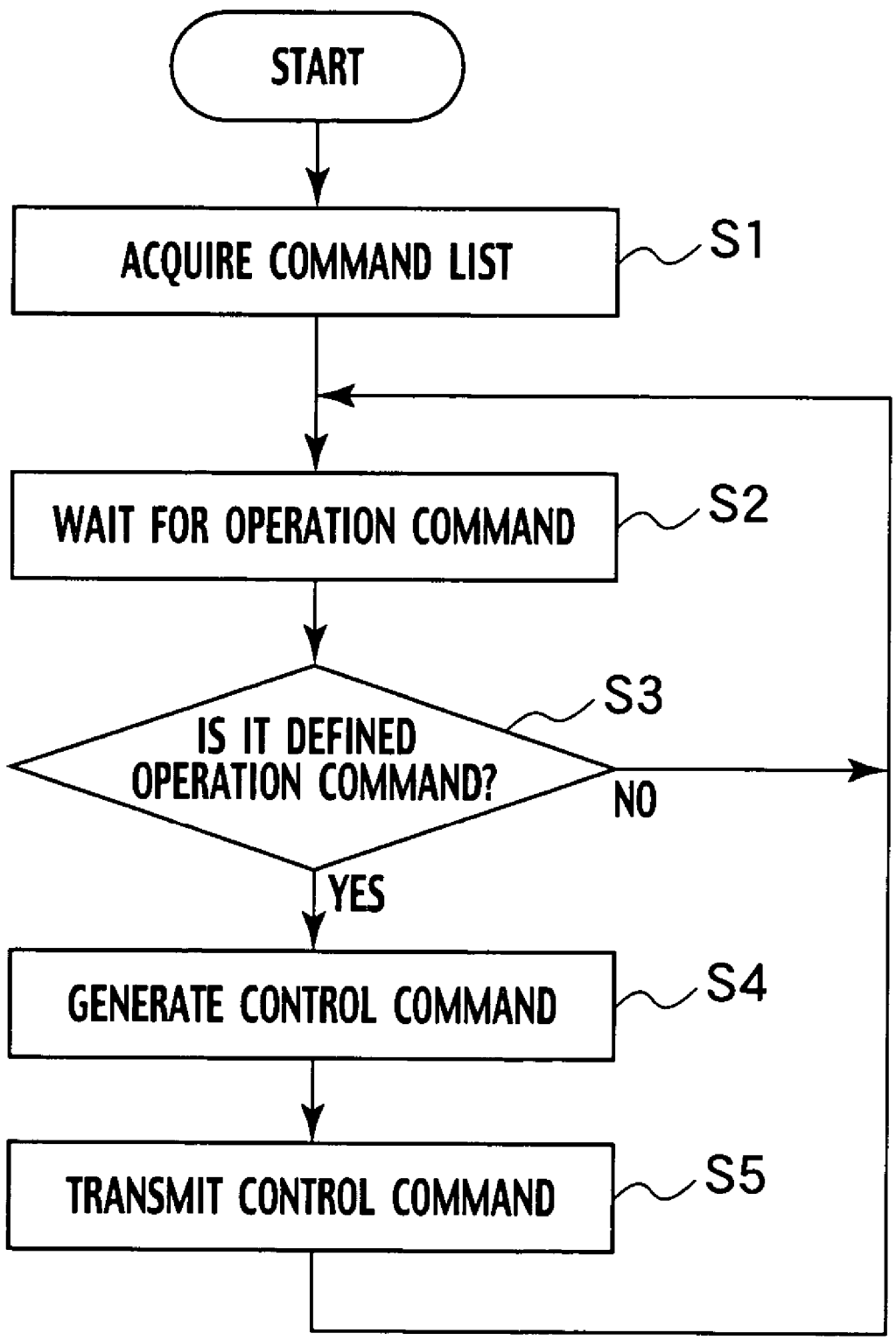

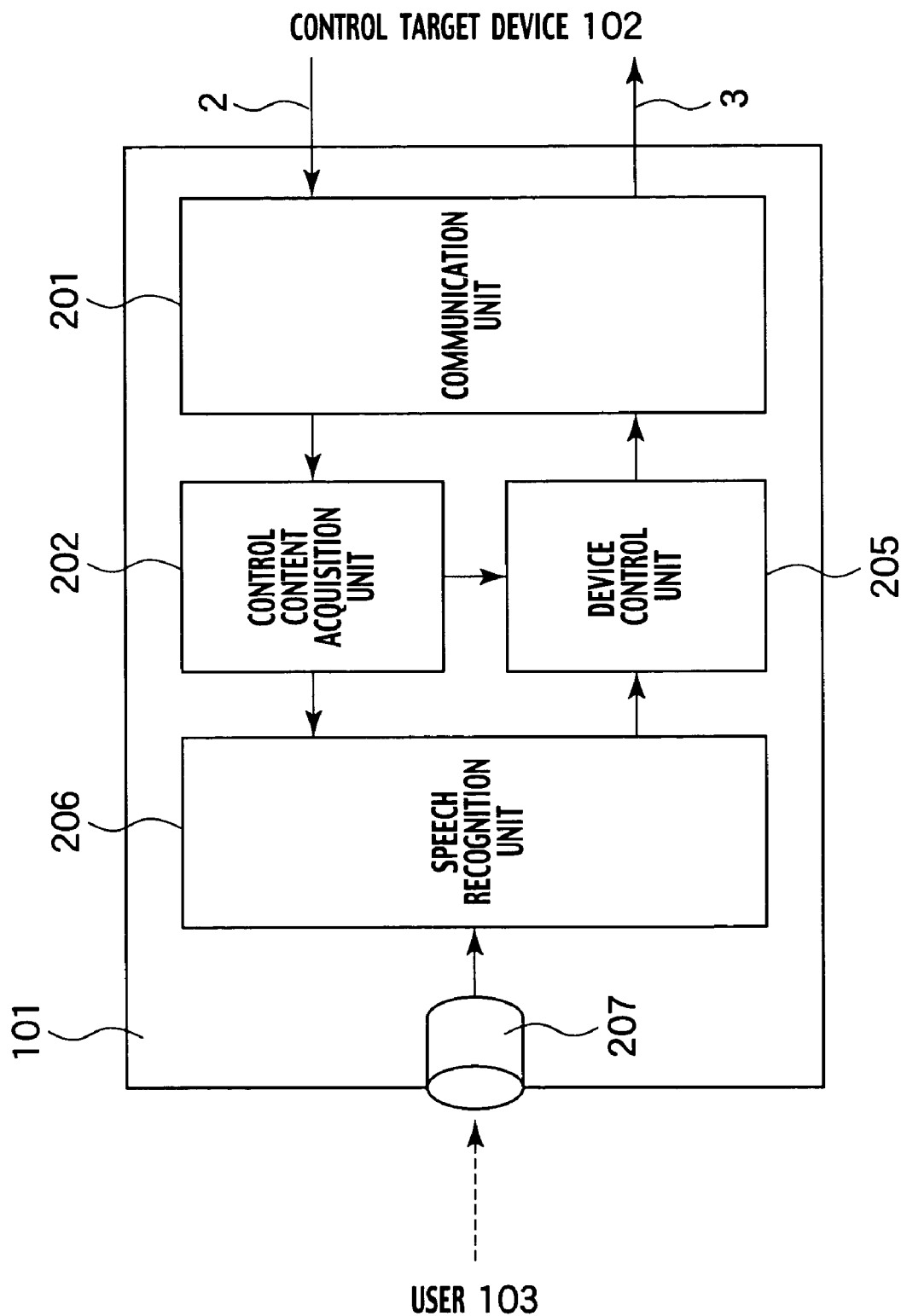

FIG. 5A

| VOCABULARY | COMMAND |
|---|---|
| TURN POWER ON | 1 |
| RAISE TEMPERATURE | 2 |
| LOWER TEMPERATURE | 3 |
| HIGH BLOW | 4 |
| LOW BLOW | 5 |
| SWING | 6 |

FIG. 5B

| VOCABULARY | COMMAND |
|---|---|
| TURN POWER ON | 1 |
| SWITCH ON | 1 |
| TURN IT ON | 1 |
| RAISE TEMPERATURE | 2 |
| SET IT HIGHER | 2 |
| IT'S COLD | 2 |
| LOWER TEMPERATURE | 3 |
| SET IT LOWER | 3 |
| IT'S HOT | 3 |
| SWING | 6 |

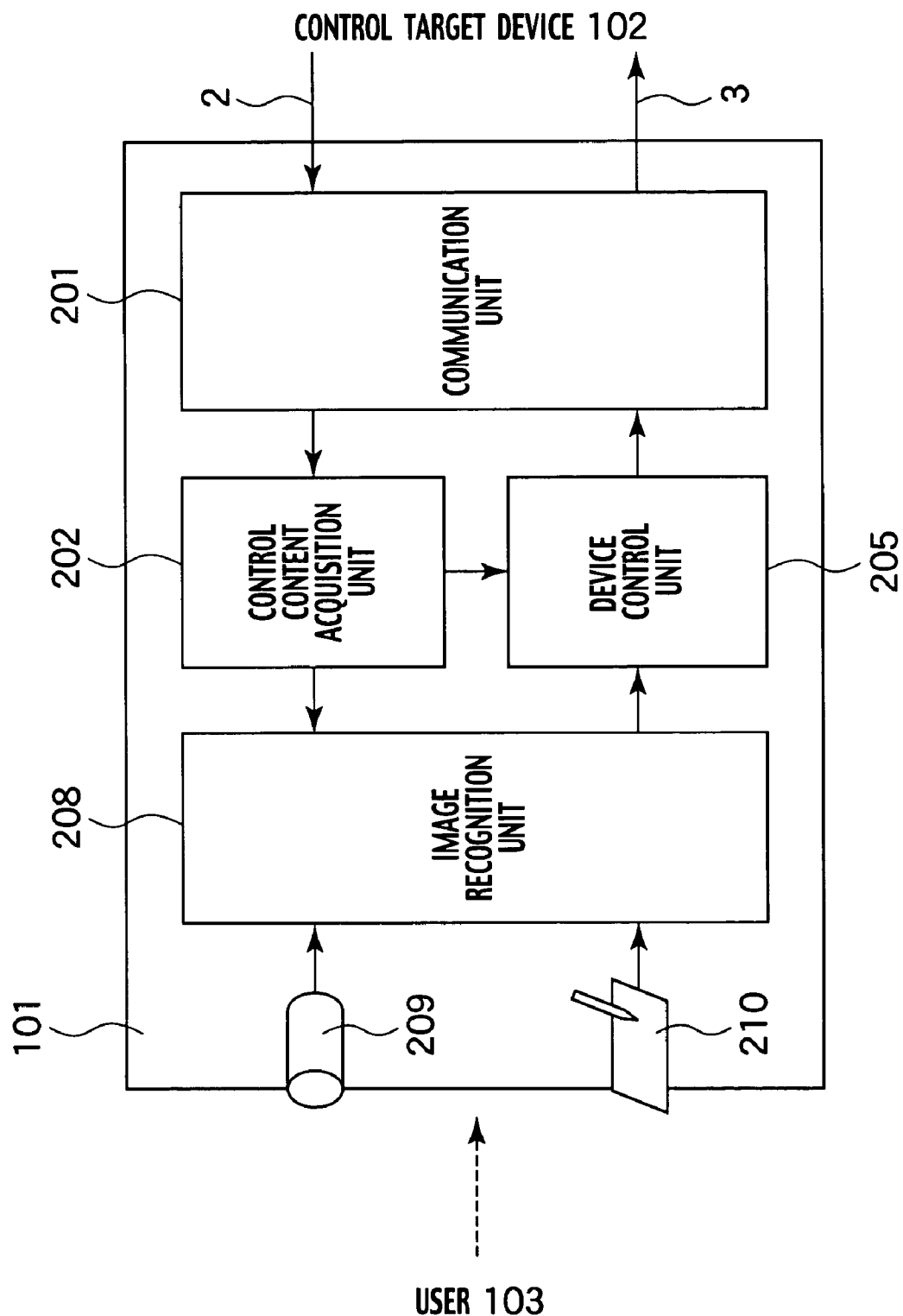

REMOTE CONTROLLING DEVICE, PROGRAM AND SYSTEM WITH CONTROL COMMAND CHANGING FUNCTION

BACKGROUND OF THE INVENTION

1. Field of the Invention

The present invention relates to remote controlling device, program and system for controlling a device upon receiving a command from a user, and more particularly to remote controlling device, program and system capable of changing control commands depending on a control target device.

2. Description of the Related Art

In order for a user of a device to control the device located at a remote location, a remote controlling device has been used. For example, a remote controlling device for changing a channel of a TV (television) by utilizing infrared rays and a remote controlling device for setting a temperature setting of an air conditioner are widely utilized.

In recent years, due to the advance of a network such as the Internet, it has become possible to control a control target device such as a home electronic appliance that is located at home, from a visited site. In such a case, it is customary to provide a server device having a home gateway function inside the home, receive an operation instruction from the visited site at this server device, and then carry out control of a control target device such as TV or air conditioner by a command from this server device.

These control target devices can include various types of home use devices. Even when only the home electronic appliances are considered, many types of home electronic appliances are used in the home. Among them, if a TV and an air conditioner are taken up for example, it can be seen that the required functions are largely different. The TV has a major function of receiving the TV broadcast so that operations such as a channel selection and a volume adjustment are required, whereas the air conditioner requires operations such as a temperature setting adjustment and a starting or stopping control. In general, the required remote operations and the method for commanding them are different for different devices having different functions as such. Consequently, the remote controlling devices for operating these devices have been inevitably designed individually for different operation target devices.

Also, when the operation instruction for the control target device and a command corresponding to that operation instruction are simply transferred, there have been cases where a design of a dictionary in which words required for the speech recognition are described and the corresponding command do not coincide or a subtle discrepancy from the intended operation occurs. In such cases, there arise cases where the commands for the same operation instruction are defined differently for different devices. For example, in the case of entering the operation instruction by speech, if the common operation instruction such as "switch on" is adopted, it becomes necessary to provide a processing for selecting the appropriate command according to the control target device at each occasion, which makes the processing complicated.

Such a problem can be avoided if the remote controlling device is designed separately for each control target device, but then the manufacturing cost of the remote controlling devices would be increased, and there arises another problem for the user that it would become necessary to provide a plurality of remote controlling devices for different home electronic appliances.

BRIEF SUMMARY OF THE INVENTION

It is therefore an object of the present invention to provide a remote controlling device that is not dependent on the control target device. This remote controlling device is made such that a table of correspondence between operation instructions appropriate for a control target device and commands corresponding to these operation instructions can be acquired, and the operation instruction to be given to the control target device and the operation to be actually carried out by the device according to the command can be changed.

According to one aspect of the present invention there is provided a control device for controlling a control target device by using a control command, comprising: a control information acquisition unit configured to acquire a control information containing a plurality of operation instructions and control commands respectively corresponding to the operation instructions, for controlling the control target device; a control information storing unit configured to store the control information in a rewritable form; a recognition unit configured to recognize an operation instruction entered by a user; a command search unit configured to carry out a search to check whether the operation instruction recognized by the recognition unit is contained in the control information stored by the control information storing unit, and output a control command corresponding to the operation instruction when the operation instruction is contained in the control information; and a command transmission unit configured to transmit the control command outputted by the command search unit to the control target device.

According to another aspect of the present invention function as a control device for controlling a control target device by using a control command, the computer program product comprising: a first computer program code for causing the computer to acquire a control information containing a plurality of operation instructions and control commands respectively corresponding to the operation instructions, for controlling the control target device; a second computer program code for causing the computer to store the control information in a rewritable form; a third computer program code for causing the computer to recognize an operation instruction entered by a user; a fourth computer program code for causing the computer to carry out a search to check whether the operation instruction recognized by the third computer program code is contained in the control information stored by the second computer program code, and output a control command corresponding to the operation instruction when the operation instruction is contained in the control information; and a fifth computer program code for causing the computer to transmit the control command outputted by the fourth computer program code to the control target device.

According to another aspect of the present invention there is provided a control system comprising; a control target device for carrying out a prescribed operation according to a received control command, having: a first control information storing unit configured to store a control information containing a plurality of operation instructions and control commands respectively corresponding to the operation instructions; and a control unit configured to carry out a prescribed operation according to each control command; and a control device for controlling the control target device by using a control command, having: a control information acquisition unit configured to acquire the control information for controlling the control target device, from the control target device; a second control information storing unit configured to store the control information in a rewritable form; a recognition unit configured to recognize an operation instruction entered by a user; a command search unit configured to carry out a search to check whether the operation instruction recognized by the recognition unit is contained in the control information stored by the second control information storing unit, and output a control command corresponding to the operation instruction when the operation instruction is contained in the control information; and a command transmission unit configured to transmit the control command outputted by the command search unit to the control target device.

Other features and advantages of the present invention will become apparent from the following description taken in conjunction with the accompanying drawings.

BRIEF DESCRIPTION OF THE DRAWINGS

FIG. 1 is a schematic diagram showing an exemplary system configuration according to the first embodiment of the present invention.

FIG. 2 is a block diagram showing an exemplary configuration of a control device according to the first embodiment of the present invention.

FIG. 3 is a flow chart showing an exemplary operation flow of a control device according to the first embodiment of the present invention.

FIG. 4 is a block diagram showing an exemplary configuration of a control device according to the second embodiment of the present invention.

FIGS. 5A and 5B are diagrams showing two examples of a command list according to the second embodiment of the present invention.

FIG. 6 is a block diagram showing an exemplary configuration of a control device according to the third embodiment of the present invention.

DETAILED DESCRIPTION OF THE INVENTION

Figure 7:
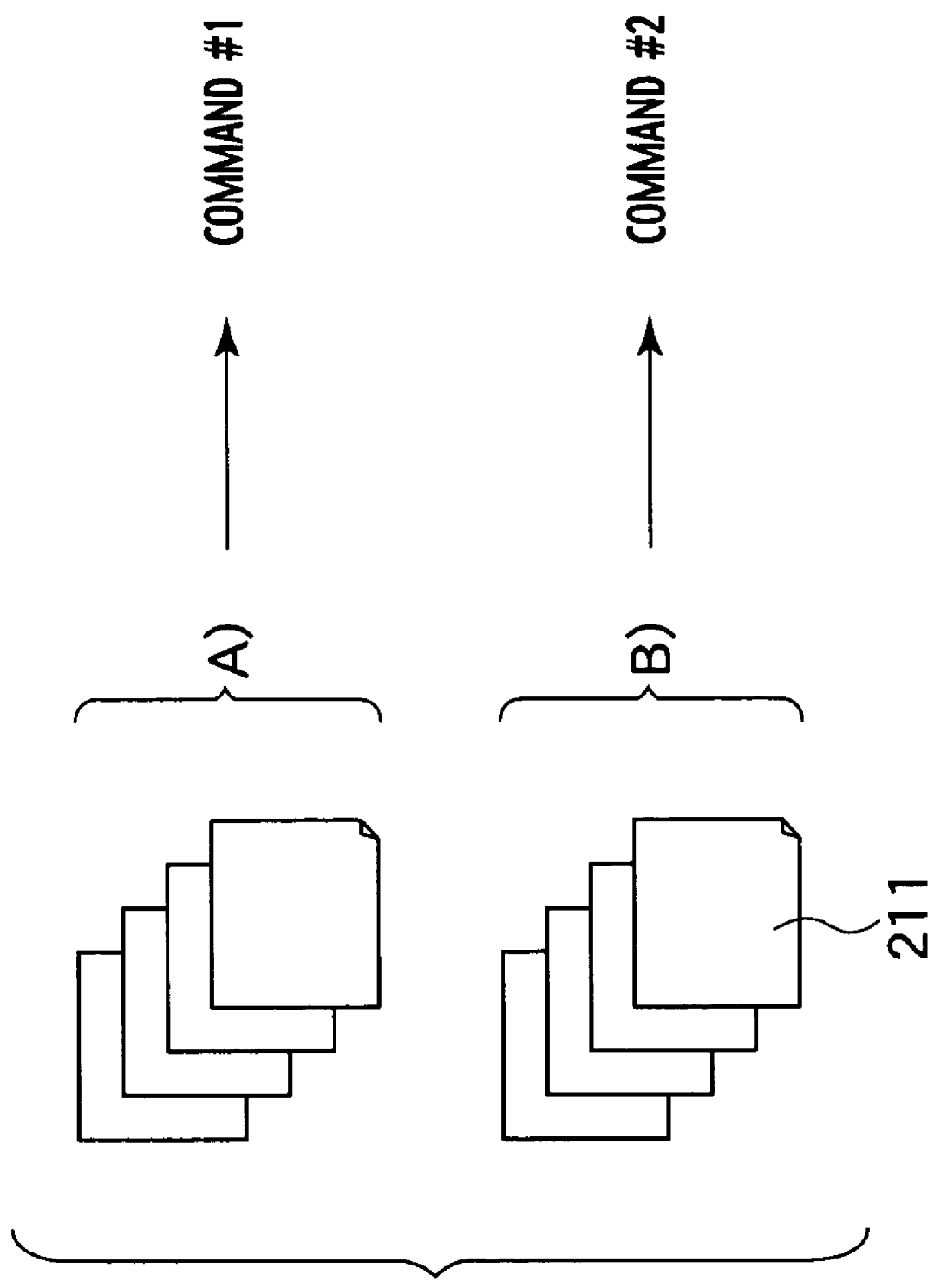
FIG. 7 is a diagram showing an example of a command list according to the third embodiment of the present invention.

Referring now to FIG. 1 to FIG. 3, the first embodiment of the present invention will be described in detail.

FIG. 1 shows an exemplary system configuration according to the first embodiment of the present invention, which comprises a control device 101 according to the present invention, a control target device 102 to be controlled by the control device 101, and a user 103 for instructing an operation of the control target device 102 through the control device 101.

The control device 101 receives an operation instruction 1 from the user 103, and carries out a control of the control target device 102, Here, the operation instruction 1 obtained from the user 103 is issued in order to operate the control target device 102 and its operation content is turning on the power of the control target device 102, for example. There are various ways for making the instruction to be issued by the user 103. For example, an instruction by speech, an instruction by pressing a switch, an instruction by gesture, etc., and any way of making the instruction can be used as long as how the user 103 wishes to operate the control target device 102 can be recognized and the instructed operation can be electronically identified somehow.

The control target device 102 is a device which can be electronically operated such as a home electronics device, which can also be operated by giving an electronic instruction from an external. In FIG. 1, this electronic instruction is given from the control device 101 as a control message 3.

In addition, the control target device 102 transmits a command list 2 to the control device 101 upon receiving some instruction or at a prescribed time interval. The method of transmitting the command list 2 by the control target device 102 is not limited to that described above, and any method can be used as long as it is possible for the control device 101 to acquire the command list 2 before receiving the operation instruction for the control target device 102 issued by the user 103.

Here, the command list 2 is a list indicating a relationship of a value obtained by electronically converting the operation instruction 1 issued by the user 103 in order to control the control target device 102 and the control message 3 to be issued to the control target device 102 when this operation instruction is received. When the operation instruction 1 is received from the user 103, the control device 101 determines the control message 3 to be issued to the control target device 102 by this list, according to a result of electronically interpreting that operation instruction 1. The concrete example of the command list 2 will be described below.

FIG. 2 shows an exemplary configuration of the control device 101 according to the first embodiment of the present invention. The control device 101 has a communication unit 201, a control content acquisition unit 202, a user interface 203, a recognition unit 204, and a device control unit 205.

The communication unit 201 has a function for carrying out communications with the control target device 102. The content to be communicated include the command list 2 to be received from the control target device 102, and the control message 3 to be given to the control target device 102. The communication scheme can be infrared (such as IDA), radio LAN (such as 802.11b) or Bluetooth™ which can realize wireless communications, or Ethernet™ or telephone list which uses wired communications. The communication scheme is not limited to those described above, and any scheme can be used as long as it is possible to convey information electronically from the control device 101 to the control target device 102 that is existing at a remote location.

The control content acquisition unit 202 has a function for acquiring the command list 2 transmitted from he control target device 102. As described above, the command list 2 here is a list indicating a relationship of a value obtained by electronically converting the operation instruction 1 issued by the user 103 in order to control the control target device 102 and the control message 3 to be issued to the control target device 102 when this operation instruction is received. The control content acquisition unit 202 stores the content of the list whenever this command list 2 is acquired from the control target device 102. At this point, the control content acquisition unit 202 at least stores the acquired command list of the control target device 102 which is the current control target, but it is also possible to store the command lists of a plurality of different control target devices 102 that were acquired previously, separately from the command list of the current control target device 102.

The user interface 203 has a function for converting the operation instruction 1 issued by the user 103 in order to control the control target device 102 into an electronic information. The operation instruction 1 issued by the user 103 can take various forms. For example, if it is designed such that the operation instruction 1 is made by pressing an operation button provided on the control device 101, the user interface 203 is the operation button. If the gesture of the user 103 is to be utilized as the operation instruction 1, the user interface 203 is an image processing device having a camera. If the human biological reaction such as perspiration or heart rate is to be utilized, the user interface 203 is an appropriate sensor. The user interface 203 can be selected appropriately according to which method is adopted for the operation instruction 1.

The recognition unit 204 has a function for recognizing and determining which operation is actually indicated by the operation instruction 1 to the control target device 102, from the operation instruction 1 issued by the user 103 as electronically converted by the user interface 203. For example, if it is designed such that when the user 103 grasps a grip, the grasping power is obtained as a voltage value through the user interface 203, and if the command list 2 contains an operation instruction indicating "turn off the power when the grip is grasped tight", the recognition unit 204 is set to determine what grasping power for grasping the grip should be recognized as "grasped tight". As in this example, the recognition unit 204 is operated to recognize the result of the electronic conversion by the user interface 203 as a prescribed operation instruction that is expressed more sensually.

Which operation instruction is actually indicated by the operation instruction 1 given from the user 103 is determined by carrying out the calculation such as a comparison with the value obtained by electronically converting the operation instruction 1 in the command list that has been acquired from the control target device 102 and stored by the control content acquisition unit 202. The device control unit 205 has a function for generating the control message 3 to be transmitted to the control target device 102, that is corresponding to the operation instruction recognized by the recognition unit 204. The control message 3 to be transmitted to the control target device 102 can be generated from the command list 2 acquired and stored by the control content acquisition unit 202. The control message 3 that can be directly understood by the control target device 102 is generated according to a command that is related to the operation instruction recognized by the recognition unit 204 in the command list 2. The generated control message 3 is transmitted to the control target device 102 through the communication unit 201.

With this configuration, even when the operation instructions that can be given to the control target device 102 are different for different devices, the user 103 can operate the control target device 102 without providing a separate control device 101 for each control target device 102, by using the control device 101 and the control target device 102 of the present invention.

FIG. 3 shows an exemplary operation flow of the control device 101 in the first embodiment of the present invention.

First, the control device 101 acquires the command list 2 from the control target device 102 (step S1). The acquired command list is stored in the control content acquisition unit 202.

Next, it waits until the operation instruction 1 is given from the user 103 (step S2). When the operation instruction 1 is given, whether that given operation instruction is the operation instruction defined in the command list 2 acquired at the step S1 or not is judged (step S3). At this point, if it is the operation instruction that is not defined in the command list 2, the operation instruction is judged as invalid for the control target device 102 and discarded, and it waits until the operation instruction is given from the user 103 (step S1).

If it is the operation instruction defined in the command list 2, the device control unit 205 generates the control message 3 to be transmitted to the control target device 102, according to the content of the command that is related to the operation instruction in the command list 2 stored at the control content acquisition unit 202, in response to the command from the recognition unit 204 (step S4). Then, the generated message 3 is transmitted to the control target device 102 (step S5).

After transmitting the control message 3, it waits until the operation instruction 1 is given from the user 103 again (step S1).

According to such a method, even when the commands corresponding to the operation instructions that can be given to the control target device 102 are different for different devices, the user 103 can operate the control target device 102 without providing a separate control device 101 for each control target device 102, by using the control device 101 and the control target device 102 of the present invention.

Referring now to FIG. 4 and FIGS. 5A and 5B, the second embodiment of the present invention will be described in detail.

The difference between the first embodiment and the second embodiment of the present invention is that the user interface 203 and the recognition unit 204 in the control device 101 of the first embodiment are replaced by a microphone 207 and a speech recognition unit 206, respectively.

An exemplary system configuration according to the second embodiment is the same as that of FIG. 1 described above.

FIG. 4 shows an exemplary configuration of the control device 101 according to the second embodiment. The control device 101 has a communication unit 201, a control content acquisition unit 202, a device control unit 205, a speech recognition unit 206, and a microphone 207.

In the following description, the speech recognition unit 206 and the microphone 207 that constitute the difference between the first embodiment and the second embodiment will be mainly described. The communication unit 201, the control content acquisition unit 202 and the device control unit 205 are the same as those of the first embodiment so that their description will be omitted.

The microphone 207 picks up the operation instruction 1 for the control target device 102 uttered as speech by the user 103, and converts it into electric signals. For example, the speech such as "hot" or "cold", the hand clapping sound or the sound of a musical instrument is converted into the electric signals, and these signals are outputted to the speech recognition unit 206. The speech uttered by the user 103 contains the speech issued with an intention of operating the control target device 102 through the control device 101, that is the operation instruction 1.

The speech recognition unit 206 has a function for receiving the electric signals containing the operation instruction 1 that are generated by the microphone 207, and recognizing the actual operation instruction for the control target device 102. At a time of recognizing the operation instruction, the speech recognition unit 206 removes unnecessary components such as noises from the electric signals containing the operation instruction 1 and extracts the speech signal corresponding to the speech of the operation instruction 1.

There are many known methods for carrying out the speech recognition from the extracted speech signal, and here a method for carrying out the recognition by the comparison of the extracted speech signal with the value obtained by electronically converting the operation instruction in the command list 2 stored by the control content acquisition unit 202 will be described.

Here, two examples of the command list 2 are shown in FIGS. 5A and 5B. FIGS. 5A and 5B show the command list in the case where the control target device 102 is assumed to be an air conditioner. In these figures, the vocabulary indicates the operation content itself as the instruction for the sake of explanation, but in practice it is stored as the value obtained by electronically converting this operation instruction in the command list. FIG. 5A shows a basic command list, in which one operation instruction is related to one command. For example, when the user 103 utters the speech "turn power on" to the control device 101, the command "1" is selected. Here, the command indicates at least a value expressed in a form that can be described in the command list, which is an information to be used by the device control unit 205 in generating the control message 3 that can be directly understood by the control target device 102.

FIG. 5B shows the command list by which one command can be given by a plurality of operation instructions. In the case of FIG. 5A, it is necessary to utter "turn power on" in order to turn the power on, whereas in the case of FIG. 5B, it is also possible to instruct the same operation by the other vocabularies such as "switch on" or "turn it on".

As it becomes possible to instruct one operation by a plurality of phrases indicating that operation which are ordinarily used, it becomes possible for the user 103 to give the operation instruction more naturally. Consequently, it becomes possible to provide the control device which is easier to use for the user.

The speech recognition unit 206 sequentially compares the extracted speech signal with the value obtained by electronically converting the vocabulary in the command list 2 stored by the control content acquisition unit 202. At a time of the comparison, the correlation between these two values is calculated. The value with the highest correlation value among those for which the calculated correlation value exceeds a prescribed setting value can be judged as the speech instruction of the vocabulary that is the same as the vocabulary that is converted into this value. At this point, when the correlation value exceeding the prescribed setting value cannot be obtained from any value, it is judged as the speech instruction other than the operation instructions defined by the control target device 102. When there is the value that is judged as correlated, the command related to the vocabulary that is converted into this value is acquired from the command list 2 stored by the control content acquisition unit 202, and this result is outputted to the device control unit 205.

The method of the speech recognition is not limited to that described above, and any method can be used as long as it is a method capable of identifying which one of the electronically converted values described in the command list 2 corresponds to the operation instruction 1 in speech obtained from the microphone 207.

With this configuration, even when the commands corresponding to the operation instructions in speeches that can be given to the control target device 102 are different for different devices, the user 103 can operate the control target device 102 by speeches without providing a separate control device 101 for each control target device 102, by using the control device 101 and the control target device 102 of the present invention.

An exemplary operation flow of the control device 101 of the second embodiment is the same as that shown in FIG. 3 described above.

Referring now to FIG. 6 and FIG. 7, the third embodiment of the present invention will be described in detail.

The difference between the first embodiment and the third embodiment of the present invention is that the user interface 203 and the recognition unit 204 in the control device 101 of the first embodiment are replaced by a camera 209 and a tablet 210, and an image recognition unit 208, respectively.

An exemplary system configuration according to the third embodiment is the same as that of FIG. 1 described above.

FIG. 6 shows an exemplary configuration of the control device 101 according to the third embodiment. The control device 101 has a communication unit 201, a control content acquisition unit 202, a device control unit 205, an image recognition unit 208, a camera 209, and a table 210.

In the following description, the image recognition unit 208, the camera 209 and the table 210 that constitute the difference between the first embodiment and the third embodiment will be mainly described. The communication unit 201, the control content acquisition unit 202 and the device control unit 205 are the same as those of the first embodiment so that their description will be omitted.

The camera 209 electronically converts the gesture of the operation instruction 1 for the control target device 102 made by the user 103 into image signals. Apart from the method of instruction using the physical body in terms of the gesture, it is also possible to image a paper with a figure drawn thereon, for example. It can be the method of instruction in which the temperature setting is raised when the drawn figure is an upward arrow, for example. The electronically converted image information is outputted to the image recognition unit 208.

The tablet 210 has a function for converting a figure drawn on the table 210 by a pen into electronic signals. For example, when the user 103 draws a figure or characters on the tablet 210, its shape can be converted into the electronic signals. In the case of drawing characters, it can be designed such that when the characters "stop" are drawn on the tablet 210, the control target device 102 is instructed to "stop".

The camera 209 and the tablet 210 are used in order to input the figure electronically into the control device 101. The figure or the gesture is the intuitive way of expression for the user 103, so that it can often realize the method of instruction that is easier to understand for the user.

The image recognition unit 208 has a function for receiving the electric signals regarding the image information that is captured and coded by the camera 209 or the tablet 210, and recognizing the actual operation instruction for the control target device 102. When the obtained image information is characters, these characters can be recognized such that the operation instruction can be recognized directly. Also, when the obtained image information is a figure information for the figure or the gesture, that figure is matched with a prescribed figure information and recognized as the operation instruction.

There are many known methods for carrying out the image recognition of the figure, and here a method for carrying out the recognition by the comparison of the image information with the image obtained by electronically converting the operation instruction in the command list 2 stored by the control content acquisition unit 202 will be described.

Here, one example of the command list 2 is shown in FIG. 7 conceptually. FIG. 7 shows a relationship between reference images 211 to be compared with the image signal captured by the camera 209 or the tablet 210 and commands #1 and #2 that are related to these reference images 211. If the image signal is similar to the reference image contained in the group A, it is judged that the user 103 instructed the command #1. If the image signal is similar to the reference image contained in the group B, it is judged that the user 103 instructed the command #2.

The image recognition unit 208 sequentially compares the obtained image signal with the value obtained by electronically converting the reference image in the command list 2 stored by the control content acquisition unit 202. At a time of the comparison, the correlation between these two values is calculated. The value with the highest correlation value among those for which the calculated correlation value exceeds a prescribed setting value can be judged as the image that is the same as the reference image that is converted into this value. At this point, when the correlation value exceeding the prescribed setting value cannot be obtained from any value, it is judged as not the operation instruction defined by the control target device 102. When there is the value that is judged as correlated, the command related to the reference image that is converted into this value is acquired from the command list 2 stored by the control content acquisition unit 202, and this result is outputted to the device control unit 205.

The method of the image recognition is not limited to that described above, and any method can be used as long as it is a method capable of identifying which one of the electronically converted values described in the command list 2 corresponds to the operation instruction 1 in image information obtained from the camera 209 or the tablet 210.

With this configuration, even when the commands corresponding to the operation instructions in images that can be given to the control target device 102 are different for different devices, the user 103 can operate the control target device 102 by images without providing a separate control device 101 for each control target device 102, by using the control device 101 and the control target device 102 of the present invention.

An exemplary operation flow of the control device 101 of the third embodiment is the same as that shown in FIG. 3 described above.

Figure 8:
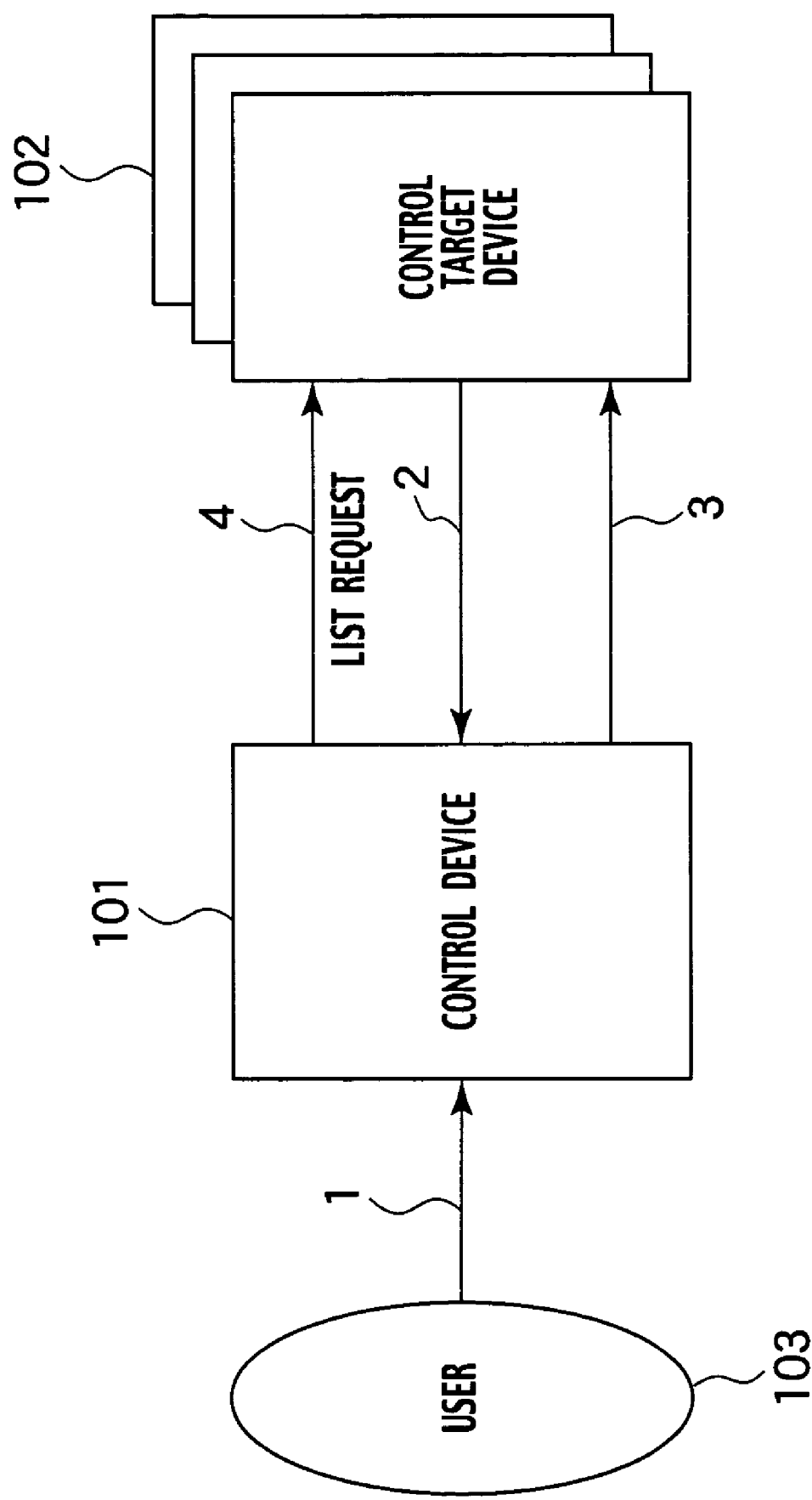
FIG. 8 is a schematic diagram showing an exemplary system configuration according to the fourth embodiment of the present invention.
Figure 9:
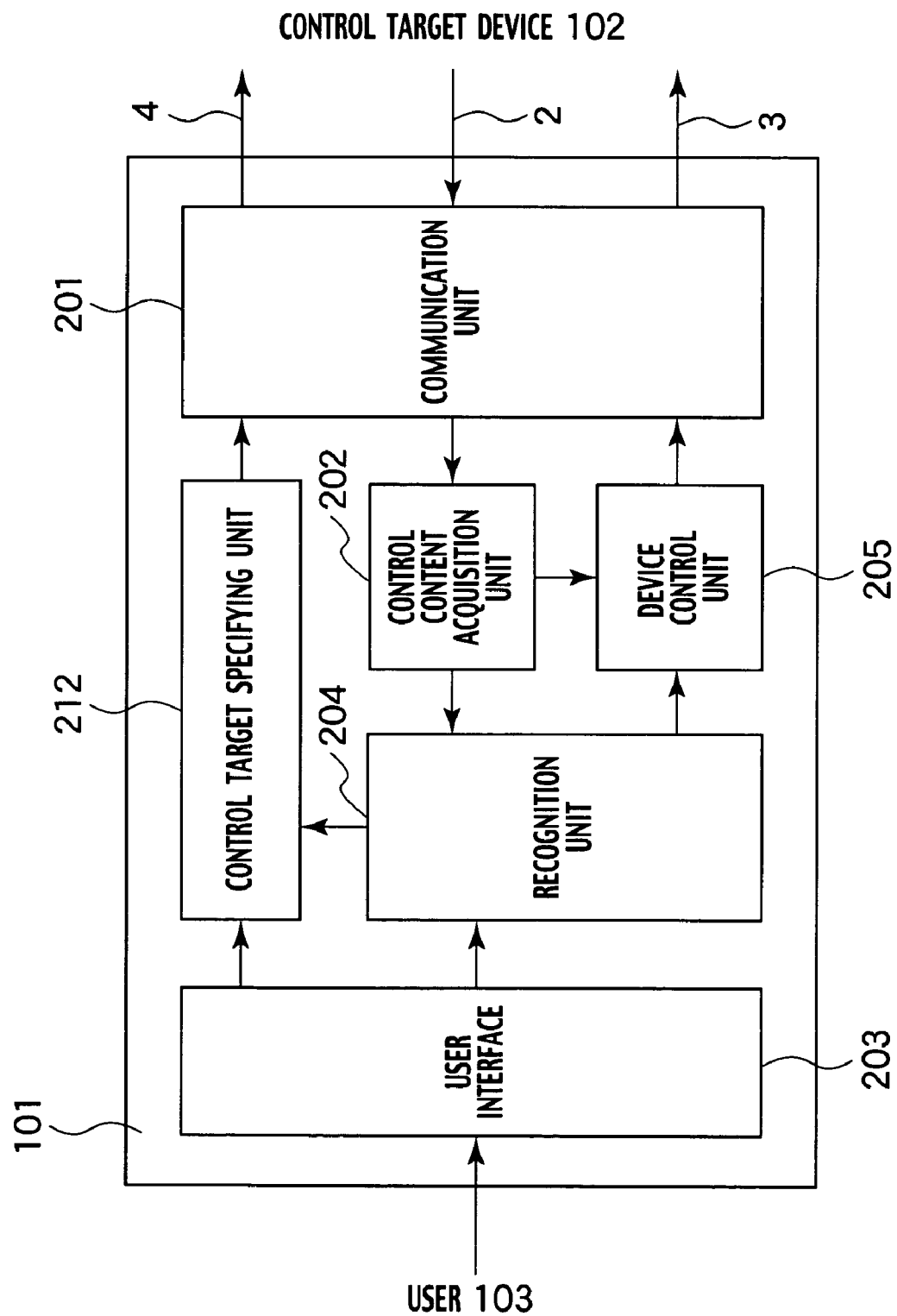
FIG. 9 is a block diagram showing an exemplary configuration of a control device according to the fourth embodiment of the present invention.
Figure 10:
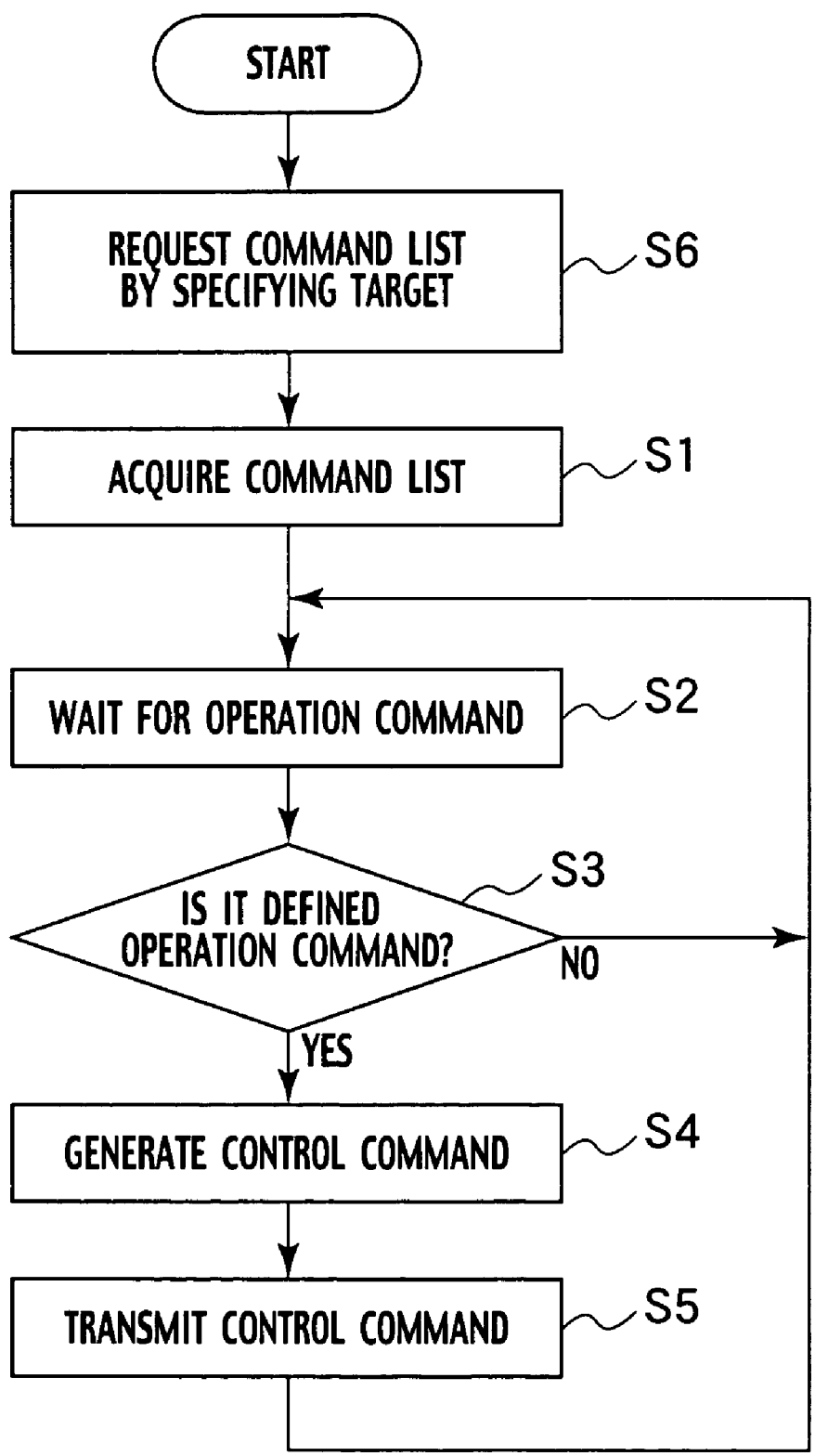
FIG. 10 is a flow chart showing an exemplary operation flow of a control device according to the fourth embodiment of the present invention.

Referring now to FIG. 8 to FIG. 10, the fourth embodiment of the present invention will be described in detail.

FIG. 8 shows an exemplary system configuration according to the fourth embodiment of the present invention, which comprises a control device 101 according to the present invention, control target devices 102 to be controlled by the control device 101, and a user 103 for instructing operations of the control target devices 102 through the control device 101.

The system configuration of the fourth embodiment and the system configuration of the first embodiment are different in that a plurality of control target devices 102 exist and a list request 4 which is a signal to be transmitted for the purpose of selecting one of these control target devices 102 to be operated is used.

The control device 101 receives an operation instruction 1 from the user 103, and carries out a control of one of the plurality of control target devices 102, Here, the operation instruction 1 obtained from the user 103 is issued in order to operate the control target device 102 and its operation content is turning on the power of the control target device 102, for example. There are various ways for making the instruction to be issued by the user 103. For example, an instruction by speech, an instruction by pressing a switch, an instruction by gesture, etc., and any way of making the instruction can be used as long as how the user 103 wishes to operate the control target device 102 can be recognized and the instructed operation can be electronically identified somehow.

The control target devices 102 are devices which can be electronically operated such as home electronics devices, which can also be operated by giving an electronic instruction from an external. In FIG. 1, this electronic instruction is given from the control device 101 as a control message 3.

In addition, according to the list request 4 issued by the control device 101, the control target device 102 identified by this list request 4 transmits a command list 2 to the control device 101. Here, the command list 2 is a list indicating a relationship of a value obtained by electronically converting the operation instruction 1 issued by the user 103 in order to control the control target device 102 and the control message 3 to be issued to the control target device 102 when this operation instruction is received. When the operation instruction 1 is received from the user 103, the control device 101 determines the control message 3 to be issued to the control target device 102 by this list, according to a result of electronically interpreting that operation instruction 1.

FIG. 9 shows an exemplary configuration of the control device 101 according to the fourth embodiment of the present invention. The control device 101 has a communication unit 201, a control content acquisition unit 202, a user interface unit 203, a recognition unit 204, a device control unit 205, and a control target specifying unit 212.

In the following description, the control target specifying unit 212 that constitutes the difference between the first embodiment and the fourth embodiment will be mainly described. The communication unit 201, the control content acquisition unit 202, a user interface 203, a recognition unit 204, and the device control unit 205 are the same as those of the first embodiment so that their description will be omitted.

The control target specifying unit 212 has a function for selecting and specifying the control target device 102 that is to be controlled by the control device 101 upon receiving the operation instruction 1 from the user 103. When the plurality of control target devices 102 exist, there is a problem for the control device 101 regarding to which control target device 102 should the control message 3 be transmitted. If the user 103 issues the operation instruction for the device that is not the operation target among the plurality of control target devices 102 by mistake, it may possibly produce a very dangerous situation. For this reason, the control target specifying unit 212 issues the list request 4 that contains information indicating the control target device, and selectively acquires the command list 2 for controlling this device from the control target device 102 that is the control target.

The specifying information for a specific control target device 102 to which the list request 4 is to be made by the control target specifying unit 212 at this point is given from the user interface 203 or the recognition unit 204.

In order to indicate a specific control target device from the user interface 203, it is possible to provide a button for each control target device 102 at the control device 101, for example. The user 103 can select the device to be operated from now by pressing a button related to the control target device 102 to be operated at that moment among these buttons. Also, in order to indicate a specific control target device from the recognition unit 203, it is possible to utter "TV" by speech and recognize a word "TV" by the recognition unit 203, and indicates the selection of the TV to the control target specifying unit 212 according to the recognition result.

The method for specifying the control target device is not limited to that described above, and any method can be used as long as it is a method by which the user 103 can select the operation target. It is also possible for the control device 101 itself to select the operation target automatically according to a prescribed rule. For example, the control device 101 is provided with a function for measuring a distance to the control target device 102 that is existing nearby, such that the closest control target device 102 is detected and this control target device 102 is selected. Besides that, it is also possible for the control device 101 to select the control target device 102 that is suitable for operating by the control device 101 under the environment in which the control device 101 is operating, according to a field such as that of the cooking appliances, for example.

The list request 4 transmitted from the control target specifying unit 212 is transmitted to the control target device 102 through the communication unit 201.

The control target device 102 selected by the list request 4 learns that it is selected by the list request 4 transmitted from the control device 101, and transmits its own command list 2 to the control device 101.

In the case where the command list of this device is already acquired and stored in the control content acquisition unit 202 when the list request to the control target device 102 of the specifying target was made by the control device 101 previously, the command list of this device as stored may be utilized without transmitting the list request 4. In this case, the time required for acquiring the command list and the communication amount required for it can be reduced.

With this configuration, even when the operation instructions that can be given to the control target device 102 are different for different devices, the user 103 can operate the control target device 102 without providing a separate control device 101 for each control target device 102, by using the control device 101 and the control target device 102 of the present invention, and it becomes possible to give the operation instruction by specifying the specific control target device 102 even when a plurality of control target devices exist.

FIG. 10 shows an exemplary operation flow of the control device 101 of the fourth embodiment.

This operation flow differs from the operation flow of the first embodiment shown in FIG. 3 in that the command list acquisition request is made at the beginning of the flow (step S6). Before receiving the operation instruction 1 for the control target device 102 from the user 103, which control target device 102 should be operated is specified. The method for specifying can be a method using the button operation or a method using a speech indication, as already described above. The list request 4 is issued from the control target specifying unit 212 to the control target device 102 that is specified in this way (step S6), and the command list 2 is acquired from the specified control target device 102 (step S1). The acquired command list 2 is stored in the control content acquisition unit 202. The subsequent flow is the same as the operation flow in the first embodiment so that its description will be omitted.

Figure 11:
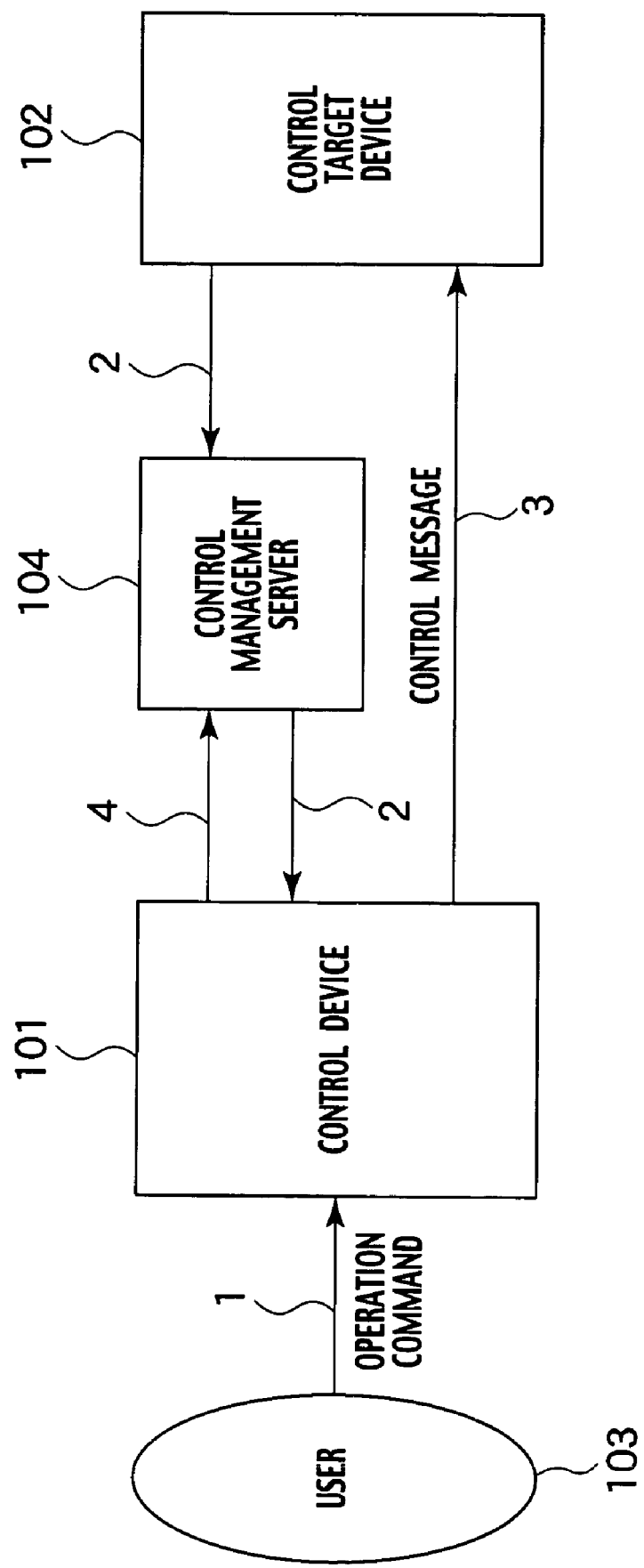
FIG. 11 is a schematic diagram showing an exemplary system configuration according to the fifth embodiment of the present invention.

Referring now to FIG. 11, the fifth embodiment of the present invention will be described in detail.

FIG. 11 shows an exemplary system configuration according to the fifth embodiment of the present invention, which comprises a control device 101, a control target devices 102, a user 103, and a control management server 104.

The system configuration of the fifth embodiment differs from the system configuration of the fourth embodiment shown in FIG. 8 in that the control management server 104 is added.

In the following description, the control management server 104 that constitutes the difference between the fourth embodiment and the fifth embodiment will be mainly described. The control device 101, the control target device 102 and the user 103 are the same as those of the fourth embodiment so that their description will be omitted.

The control management server 104 has a function for storing in advance all or a part of the command lists 2 that are expected to be used, or acquiring and storing the command list 2 on demand from the control target device 102, and transmitting the command list of the control target device that is the operation target of the user 103 to the control device 101 upon receiving the list request 4 from the control device 101. As already described, the list request 4 issued by the control device 101 contains information indicating which control target device 102 is the control target of the control device 101. The control management server 104 receives this list request 4 from the control device 101, and selects the command list of that device among the command lists 2 stored by the control management server 104 according to the information indicating the control target, and transmits this command list 2 to the control device 101.

The command list 2 to be stored by the control management server 104 is transmitted as the control target device 102 receives some instruction from the control management server 104 or some other device, or each control target device 102 transmits its own command list at a prescribed time interval to the control management server 104. The method for acquiring the command list 2 that is to be carried out by the control management server 104 can be carried out by either method and timing. It is preferable to use a configuration in which the specific command list can be acquired from the control management server 104 when the control device 101 issues the list request 4.

The control management server 104 determines which command list 2 should be given to the control device 101 according to the list request 4. The determination method can be a method for determining it according to a mutual relationship of the control device 101 and the control target device 102, Here, the mutual relationship is a measured positional relationship in the case where a position sensor or proximity sensor is provided at the control device 101 and the control device 101 itself measures where it is located and which control target device 102 is existing in its surrounding. Also, in the case of communications utilizing power lines provided inside the home, the command list 2 to be given can be determined by detecting the control target device 102 which is connected to the network and which has its power turned on.

The control management server 104 may be arranged at any location as long as it is connected to the control device 101 via a network. For example, in the case of utilizing the control management server 104 by connecting it to the home network, it can be implemented inside one or a plurality of home servers. Of course, if the home electronics devices are connected to the network, each home electronics device may play a role of the control management device 104 logically with respect to the other devices.

It is also possible for the control device 101 to acquire the command list 2 from one of a plurality of control management servers 104 that can carry out communications at a moment. At this point, the selection of the control management server 104 by the control device 101 can be made by a method for selecting the control management server 104 by directly specifying the network address of the control management server 104. It is also possible to provide a position sensor or a proximity sensor at the control device 101 and determine the control management server 104 to be selected according to a mutual relationship with the control management server 104.

With this configuration, even when the operation instructions that can be given to the control target device 102 are different for different devices, the user 103 can operate the control target device 102 without providing a separate control device 101 for each control target device 102, by using the control device 101 and the control target device 102 of the present invention, and it becomes unnecessary to make the request of the command list to the device whenever the device is specified.

An exemplary configuration of the control device 101 in the fifth embodiment is the same as that of FIG. 9, except that the destination of the list request 4 and the command list 2 becomes the control management server 104.

Also, an exemplary operation flow of the control device 101 of the fifth embodiment is the same as that of FIG. 10, except that the request target at the step S6 and the step S1 becomes the control management server 104.

As described, according to the present invention, even when the commands corresponding to the operation instructions that can be given to the control target device are different for different devices, the user can operate the control target device without providing a separate control device for each control target device.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the control device, the control target device, and the control management server of each of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A control device for controlling a control target device by using a control command, comprising:
   a control information acquisition unit configured to acquire control information containing a plurality of operation instructions and control commands for controlling the control target device, each operation instruction corresponding to one of the control commands;
   a control information storing unit configured to store the control information in a rewritable form;
   a recognition unit configured to recognize an operation instruction entered by a user;
   a command search unit configured to carry out a search to check whether the operation instruction recognized by the recognition unit is contained in the control information stored by the control information storing unit, and output a control command corresponding to the operation instruction when the operation instruction is contained in the control information; and
   a command transmission unit configured to transmit the control command outputted by the command search unit to the control target device.

2. The control device of claim 1, wherein each operation instruction in the control information is given in a form of speech information, and the recognition unit recognizes the operation instruction entered by the user according to the speech information.

3. The control device of claim 1, wherein each operation instruction in the control information is given in a form of image information, and the recognition unit recognizes the operation instruction entered by the user according to the image information.

4. The control device of claim 1, wherein each operation instruction in the control information is given in a form of text information, and the recognition unit recognizes the operation instruction entered by the user according to the text information.

5. The control device of claim 1, wherein the control information acquisition unit acquires the control information for controlling the control target device by requesting the control information to the control target device.

6. The control device of claim 5, wherein the control information acquisition unit requests the control information to the control target device when a new control information that is not stored by the control information storing unit is to be acquired.

7. A computer program product stored in a computer readable medium, for causing a computer when executing the computer program product to function as a control device for controlling a control target device by using a control command, the computer program product comprising:
   a first computer program code for causing the computer to acquire control information containing a plurality of operation instructions and control commands for controlling the control target device, each operation instruction corresponding to one of the control commands;
   a second computer program code for causing the computer to store the control information in a rewritable form;
   a third computer program code for causing the computer to recognize an operation instruction entered by a user;

a fourth computer program code for causing the computer to carry out a search to check whether the operation instruction recognized by the third computer program code is contained in the control information stored by the second computer program code, and output a control command corresponding to the operation instruction when the operation instruction is contained in the control information; and a fifth computer program code for causing the computer to transmit the control command outputted by the fourth computer program code to the control target device.

8. A control system comprising;

a control target device for carrying out a prescribed operation according to a received control command, having:
- a first control information storing unit configured to store control information containing a plurality of operation instructions and control commands, each operation instruction corresponding to one of the control commands; and
- a control unit configured to carry out a prescribed operation according to each control command; and a control device for controlling the control target device by using a control command, having:
- a control information acquisition unit configured to acquire the control information for controlling the control target device, from the control target device;
- a second control information storing unit configured to store the control information in a rewritable form;
- a recognition unit configured to recognize an operation instruction entered by a user;
- a command search unit configured to carry out a search to check whether the operation instruction recognized by the recognition unit is contained in the control information stored by the second control information storing unit, and output a control command corresponding to the operation instruction when the operation instruction is contained in the control information; and
- a command transmission unit configured to transmit the control command outputted by the command search unit to the control target device.

9. The control system of claim 8, further comprising:

a control management device provided between the control target device and the control device, having:
- a third control information storing unit configured to receive and store the control information transmitted by the control target device; and
- a control information supply unit configured to supply a requested control information among the control information stored by the third control information storing unit to the control device, in response to a request for a control information acquisition from the control device.

10. The control system of claim 8, wherein each operation instruction in the control information is given in a form of speech information, and the recognition unit of the control device recognizes the operation instruction entered by the user according to the speech information.

11. The control system of claim 8, wherein each operation instruction in the control information is given in a form of image information, and the recognition unit of the control device recognizes the operation instruction entered by the user according to the image information.

12. The control system of claim 8, wherein each operation instruction in the control information is given in a form of text information, and the recognition unit of the control device recognizes the operation instruction entered by the user according to the text Information.

13. The control system of claim 8, wherein the control information acquisition unit of the control device acquires the control information for controlling the control target device by requesting the control information to the control target device.

14. The control system of claim 13, wherein the control information acquisition unit of the control device requests the control information to the control target device when a new control information that is not stored by the control information storing unit is to be acquired.

15. The control system of claim 8, wherein the control target device is a home electronics device.

* * * * *